United States Patent [19]
Nielson

[11] 3,774,228
[45] Nov. 20, 1973

[54] INVENTORY RECORDING APPARATUS

[76] Inventor: Lonnie Ray Nielson, 132 N. Granados, Solana Beach, Calif. 92075

[22] Filed: Apr. 5, 1972

[21] Appl. No.: 241,126

[52] U.S. Cl. ............... 346/104, 83/660, 220/22.1, 283/55, 346/146
[51] Int. Cl. ............................................. G01d
[58] Field of Search ............... 346/1, 41, 51, 78, 346/95, 104, 141, 146; 83/660; 283/55; 220/22.1; 221/22

[56] References Cited
UNITED STATES PATENTS

| | | | |
|---|---|---|---|
| 504,159 | 8/1893 | Herrick | 346/95 |
| 1,063,657 | 6/1913 | Choate | 220/22.1 |
| 3,134,635 | 5/1964 | Minter | 346/104 X |

*Primary Examiner*—Joseph W. Hartary
*Attorney*—Thomas H. Jones et al.

[57] ABSTRACT

A storing and counting apparatus including a container and partition means movable within said container to define the volume of a bin. Indicator means are interconnected with the partition means to indicate the position of the partition means within the container such that the number of items in the bin at a given time may be indicated by the position of the partition means. The apparatus may also include card support means, marking means carried by the indicator means, and means to move the card support means into contact with the marking means such that the number of items in the bin may be indicated on a card carried by the card support means.

An ordering apparatus for ordering articles of commerce to maintain preselected levels of the articles in an inventory. Indicator means having marking means associated therewith are moved in slideways in a top member to indicia indicating the number of articles then in stock. The top member is then positioned on a base member including a card supporting surface having an order card supported thereon in a predetermined manner with the marking means contacting the card and forming a permanent record thereon. The record card has coded information thereon pertaining to the desired quantity of each article to be maintained in the inventory. The spatial arrangement of the coded information with respect to the indicia on the top member is such that the permanent record on the card directly indicates the number of articles which must be ordered to maintain the preselected inventory level of that article.

8 Claims, 10 Drawing Figures

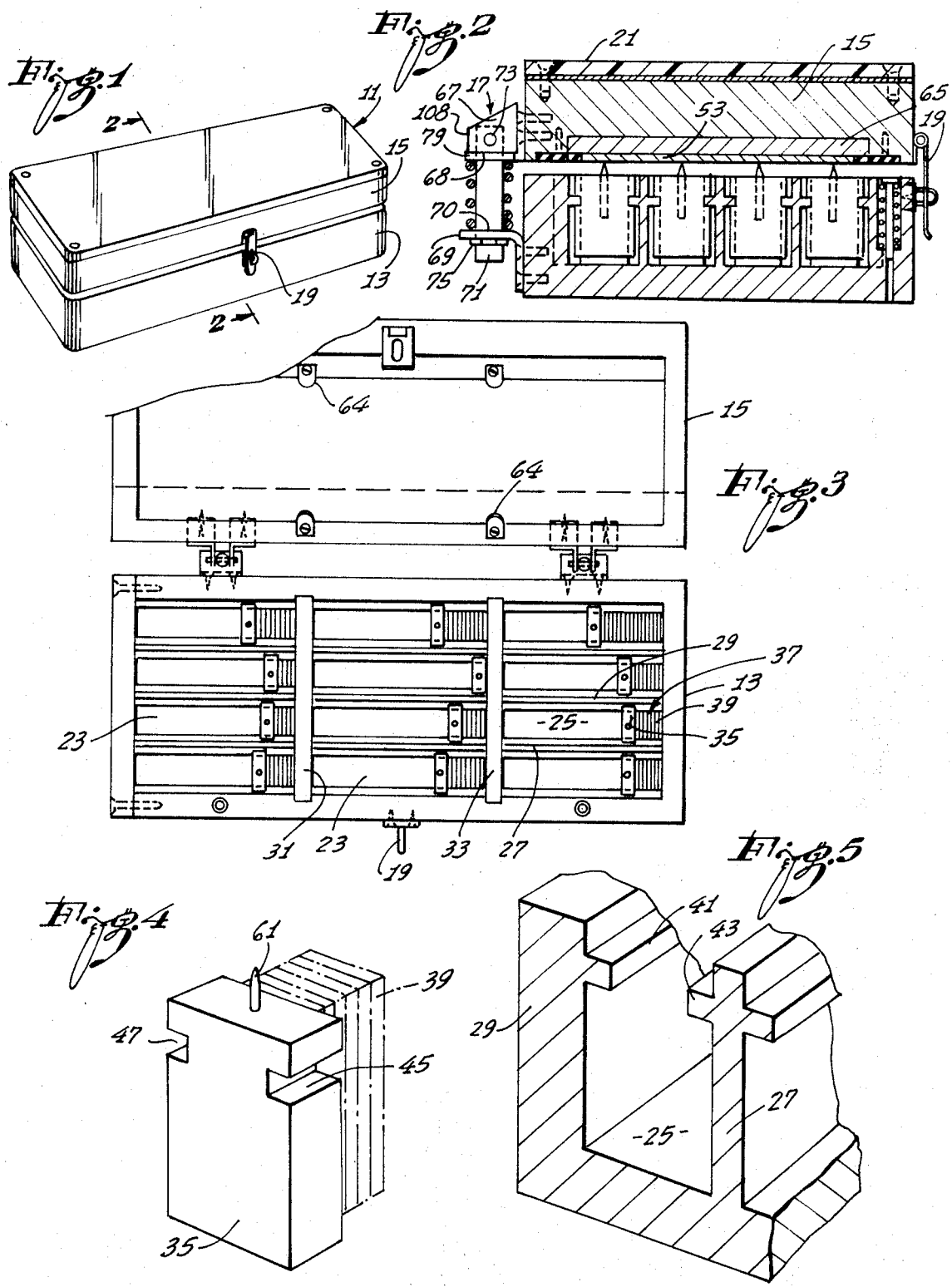

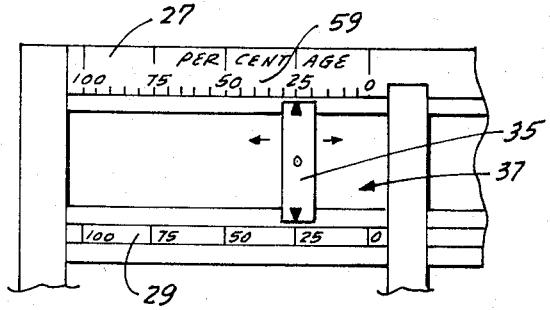

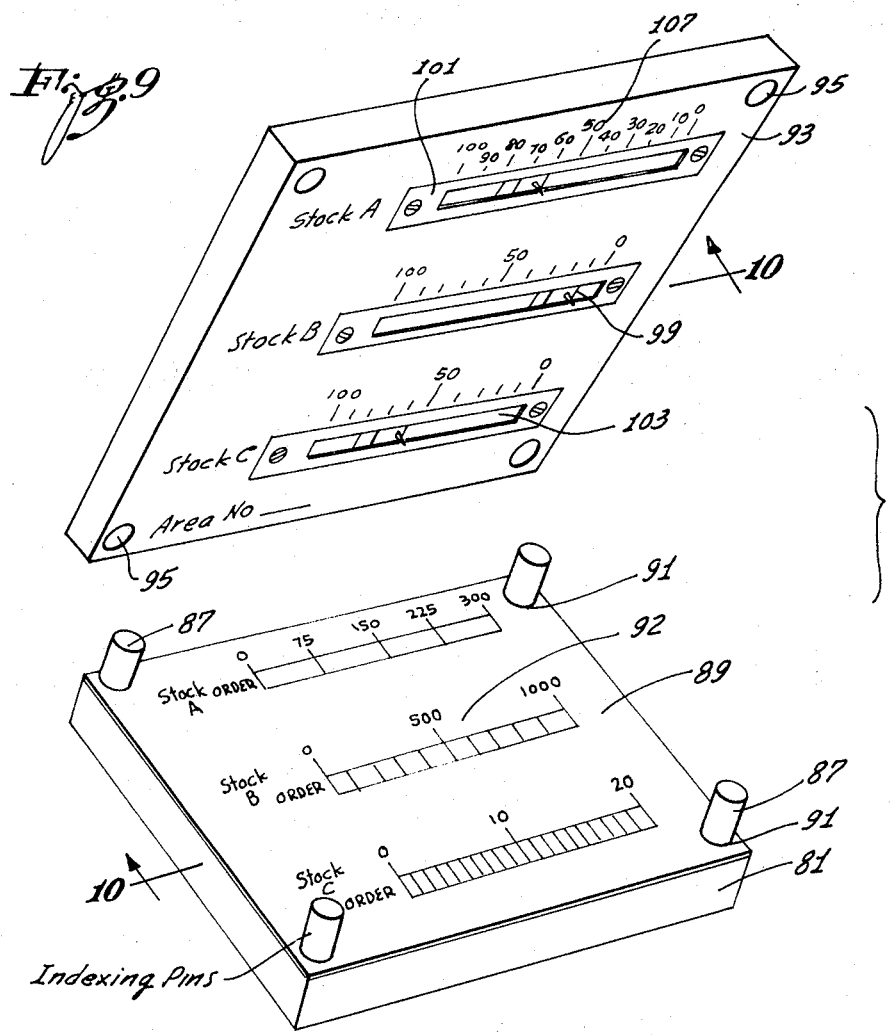
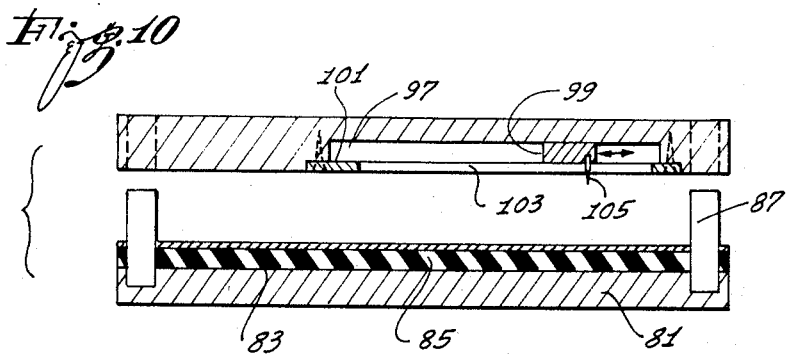

INVENTORY RECORDING APPARATUS

BACKGROUND OF THE INVENTION

Various procedures are used by merchants and manufacturers in maintaining an inventory of the various items which they stock and sell. The simplest of these procedures is to count the number of the various items which are in stock and to then order a sufficient number of each item to bring the inventory back to its predetermined level. This procedure is very slow and laborious since it involves physically counting the items presently in stock.

In more complex systems for maintaining inventories, as used by large businesses, computerized techniques may be employed. This results in eliminating certain of the manual operations required in hand counting and in thereby reducing the amount of time required for taking inventory. However, due to the high cost of computer time, a computerized inventory procedure is impractical for small and medium-sized businesses whose sales volume does not justify this expense.

Due to the high cost of computerized procedures for taking inventory, on the one hand, and the time consuming and laborious nature of taking inventory by physically counting items in stock, on the other, neither of these procedures is satisfactory for a small to medium size businessman. However, at the present time, there is no practical alternative which would eliminate certain manual operations in taking inventory and, yet, not require the high cost of a computer.

SUMMARY OF THE INVENTION

The present invention provides an alternative procedure for maintaining an inventory of various items in stock which eliminates certain manual operations without requiring the use of a computer.

In accord with one aspect of the invention, items to be stocked are stored in a container having partition means therein which define the volume of a bin. Indicator means are interconnected with the partition means to indicate the position of the partition means within the container. Thus, by moving the partition means within the container so that the volume of the bin is completely occupied by the items contained therein, the number of items in stock can be determined. By utilizing this procedure, it is not necessary that the items in the container be physically counted.

Conveniently, the container is provided with card support means for supporting a record card. Marking means are carried by the indicator means with means being provided to move the card support means into contact with the marking means. In this manner, the position of the partition means and the number of items then in stock is conveniently translated into usable information in the form of a permanent record on a record card.

Preferably, the container has the interior configuration of a rectangular block with the partition means having a planar rectangular shape and being positioned to move along an axis of the container interior while remaining substantially perpendicular to at least two of its interior surfaces. This particular configuration is most useful for storing and counting items which have two parallel outer surfaces. The items may then be arranged within the container with their parallel surfaces positioned at right angles to the direction of movement of the partition means such that the position of the partition means has a direct relation to the distance between the two parallel surfaces on each of the articles. As one of the articles is removed from the bin, the partition means may then be moved a distance equal to this distance in reducing the volume of the bin by the thickness of one article.

Articles stored within the container may also have irregular shapes. If the articles have an inrregular shape, there will be void spaces between the individual articles. The position of the partition means within the container will, thus, not be quite as accurate as indicator of the number of items in the container as when the articles have two parallel surfaces spaced a uniform distance apart. When a relatively large number of articles having an irregular shape are stored within a container, the percentage of void space tends to be constant if the orientation of the individual articles is random. Thus, even though voids exist, the position of the partition means within the container in defining the volume of the bin when fully occupied by the articles is a fairly accurate measure of the number of articles within the container.

In forming a permanent record of the number of items in stock within a container, the marking means preferably comprise a punch which is adapted to punch a hole in a record card when brought in contact therewith. Card alignment means are provided to align the card on the card support means in a predetermined manner with respect to the marking means such that selected indicia on the card may be brought into engagement with the marking means. Positioning means may also be provided which are interconnected with the card support means. The positioning means function to position the card supporting surface of the card support means at approximately a right angle to the axis of the marking means prior to contact of the marking means with the card supporting surface. When the marking means is a punch, it will, therefore, pass cleanly through the record card without tearing or gouging it.

In another aspect of the invention, inventory ordering apparatus is provided in which a top member is employed which has slideways therein with indicator means slidably received within the slideways. Marking means are carried by the indicator means and a first set of indicia are provided on the top member in juxtaposition to each of the slideways with each of the first set of indicia representing a numerical range to indicate the number of articles in stock.

A base member is provided which includes an order card supporting surface. An order card is supported in a predetermined manner on the supporting surface and a second set of indicia are provided on the order card with each of the indicia indicating a numerical range indicating a predetermined inventory level. Positioning means are provided to position the top member on the base member with the top member occupying a predetermined position with respect to the base member and the marking means in contact with the order card to form a permanent record thereon. The first set of indicia on the top member are positioned with respect to the second set of indicia on the order card such that the permanent record formed on the order card directly indicates the number of articles to be ordered to maintain the inventory at the predetermined level.

The present invention also provides a method for maintaining a preselected quantity of different articles of commerce in an inventory. In accord with the method, an order form is provided which has coded information thereon indicating the predetermined level of each item to be maintained in the inventory. A marking device for each of the different articles in the inventory is provided and each of the marking devices is then moved to a position that corresponds with the number of the articles then in stock. The marking devices are then brought into coacting relationship with an order form that has the coded information or indicia thereon. On contact of the marking devices with the order form, a permanent record is formed on the order form which indicates the number of articles which must be ordered to maintain the quantity of that particular article at its predetermined inventory level.

DESCRIPTION OF THE FIGURES

FIG. 1 is a perspective view of a container as utilized in one embodiment of the invention;

FIG. 2 is a sectional view of the container taken on line 2—2 of FIG. 1;

FIG. 3 is a top view of the container with the container lid in an open position;

FIg. 4 is a perspective view of a partition and a marking pin carried by the partition;

FIG. 5 is a perspective view, partially in section, of a bin within the container;

FIG. 6 is a top view of a bin wherein the sides thereof have been provided with indicia indicating the percentage of articles in the bin with respect to the total bin volume;

FIG. 7 is a top view of an inventory card which has been printed to reflect a predetermined number of articles to be maintained in the inventory;

FIG. 8 is a top view of an inventory card which has been printed to reflect the percentage of the desired inventory levels presently on hand;

FIG. 9 is a perspective view of another embodiment of the inventory recorder; and FIG. 10 is a sectional view of the inventory recorder taken on line 10—10 of FIG. 9.

DESCRIPTION OF PREFERRED EMBODIMENTS

With reference to FIG. 1, a container 11 is illustrated which includes a base 13 and a lid 15. As shown in FIG. 2, the lid 15 is connected to the base by means of a hinge 17 and a latch 19. The outer surface of the lid 15 may be provided with printing (not shown) to indicate the items stored in the container, and a covering of transparent material 21 may be provided to cover the printing.

The base 13, as shown in FIG. 3, is divided into a number of compartments 23. Compartment 23 is defined by a bottom 25, fixed side walls 27 and 29, and fixed end walls 31 and 33. A movable partition 35 is slidably positioned in compartment 23 and the position of the partition defines a restricted portion of the compartment 23 such as the bin 37. A number of articles 39 in inventory may be disposed within the bin 37.

The volume of the bin 37 will depend upon the position of the partition 35 within the compartment 23 which in turn depends upon the number of articles 39 within the bin 37 and the volume of each article. The shape of the bin 37 can be varied depending on the configuration of the articles stored therein. It is preferable that some fixed and uniform dimension of the articles 39 be oriented in the direction of movement of the partition 35. In this manner, the position of the partition 35 is proportional to the fixed dimension of the article 39 and can be used to determine the exact number of articles 39 in the bin 37.

Although my apparatus is particularly useful for storing and counting articles which are uniformly positioned within a bin 37, it can also be used for items which are randomly disposed within a bin. If the items are randomly disposed, the position of the partition 35 will indicate the volume of the bin occupied by the articles which volume is proportional to the number of articles in the bin.

Turning to FIGS. 4 and 5, tongues 41 and 43 extend longitudinally along the side walls 27 and 29 of the compartment 23. Grooves 45 and 47 in partition 35 are engaged by the tongues 41 and 43, respectively, when the partition 35 is operably disposed within the compartment 23. The partition 35, thus, slides between the end walls 31 and 33 on the tongues 41 and 43 to prevent the partition 35 from tilting within the compartment 23. Thus, the angle of the partition 35 with respect to the bottom 25 is maintained substantially constant.

The side walls 49 and 51 of partition 35 are in close proximity to the container side walls 27 and 29. Also, the partition 35 is preferably somewhat deep, i.e., its bottom surface is in reasonably close proximity to surface 25, which prevents turning of partition 35 within the compartment 23. By thus restricting the tilting and turning of the partition 35, the volume of the bin 37 is dictated by the number of articles 39 contained therein.

As shown in FIG. 6, the upper surfaces of side walls 27 and 29 may be provided with indicia 59. The position of the partition 35 relative to the indicia 59 indicates the number of articles 39 in the bin 37. As is shown, the indicia 59 may be provided with percentage figures designating the percentage of the compartment 23 which is occupied by the articles 39.

Turning to FIG. 2, a card 53 or other means for recording the number of items in compartments 23 may be positioned in lid 15. The card 53 is provided with indicia 55 (see FIG. 7) which reflect the predetermined number of articles 39 to be maintained in the inventory. Also, if desired, the indicia 55 may indicate the percentage of the total volume of a compartment 23 which is occupied by the articles 39 presently in stock or the number of items in stock.

As shown in FIG. 4, each of the partitions 35 is provided with a marking means such as a pin 61 for marking the card 53. When the lid 15 is closed, the pin 61 punches a hole 63 (FIG. 7) in the card 53 which indicates the position of the partition 35 within compartment 23. The position of the hole 63 with respect to the indicia 55 preferably records the number of articles 39 which must be ordered to maintain the inventory at a predetermined level.

The card 53 is preferably held in a fixed position on the lid 15 such that the position of the hole 63 accurately reflects the location of partition 35. Index tabs 64 (FIG. 3) attached to the lid 15 engage corresponding slots 66 in the invenotry card 53 (FIGS. 7 and 8). As the card 53 is inserted into lid 15, the slots 66 engage the tabs 64 to fixedly hold the card 53 within the lid 15. The position of the lid 15 is fixed with respect to the compartments 23 which, thus, in turn fixes the position of card 53 with respect to the compartments 23.

As shown in FIG. 2, the lid 15, is provided with a resilient backing 65 for the card 53. Preferably, the card 53 approaches the marking pin 61 in a plane that is perpendicular to the axis of the marking pin to insure that the card 53 is punched and not torn or gouged by the marking pin. To accomplish this purpose, a lid mounting bracket 67 and a base mounting bracket 69 are provided on the hinges 17. The undersurface 68 of mounting bracket 67 lies in a plane that is substantially parallel to the plane of the card 53. Similarly, the upper surface 70 of base mounting bracket 69 is in a plane that is substantially parallel to the plane of the card 53. A shaft 71 is pivoted to the lid mounting bracket 67 at pivot 73 and slidably engages a hole in the base mounting bracket 69 to maintain the shaft 71 in a position that is substantially perpendicular to the upper surface 70 of base bracket 69. A retaining ring 75 encircling the shaft 71 prevents its withdrawal from the base bracket 69 while a spring 77 disposed around the shaft 71 yieldingly holds the brackets 67 and 69 in a spaced-apart relation.

A flange 79 on shaft 71 engages the undersurface 68 of the lid mounting bracket 67. When the lid 15 is in an open position by pivoting about pivots 73, an end surface 108 of the mounting bracket 67 rests on and engages the upper surface of flange 79 to inhibit pivoting of the lid 15 past the vertical.

With the lid 15 in an open position and the card 53 positioned therein, the lid 15 is pivoted about pivot points 73 until the undersurfaces 68 of the mounting brackets 67 come into contact with the upper surfaces of flanges 79. In this position, the lid 15 and card 53 are held in a plane substantially perpendicular to the pins 61. Further pressure on the lid 15 causes the shaft 71 to move through the hole 73 to compress the spring 77. The shaft 71 passes through the hole 73 in a direction perpendicular to the upper surface 70 of base bracket 69 and thus, the card 53 approaches the pins 61 in a plane that is substantially perpendicular to the pins. The pins 61, thus, punch clean holes in the card 53 as they pass perpendicularly through the card into the pad 65.

As shown in FIG. 8, the card 53 may, if desired, contain indicia 55a which indicate the number of articles 39 in stock in terms of a percentage based on the predetermined inventory level for the article. The information as to the number of articles in stock may be expressed in various ways, as a percentage of the predetermined invenory level, merely as the number of articles in stock, or as the number of articles to be ordered to maintain the inventory at its predetermined level. As stated previously, it is preferable that the permanent record formed on the card 53 by pins 61 directly indicate the number of articles to be ordered to maintain the inventory at its predetermined level. The card 53 may then be used directly in ordering the required number of articles to maintain the inventory.

A further embodiment of the invention is illustrated in FIGS. 9 and 10 in which a base member 81 having an upper surface 83 supports a resilient pad 85. The base 81 is provided with indexing pegs 87 which extend substantially perpendicular to the upper surface 83 and the resilient pad 85.

An order form 89 having indexing holes 91 engages the resilient pad 85 with the indexing pegs 87 extending through indexing holes 91. The order form 89 is provided with indicia as shown generally at 92 to indicate the order number, i.e., the number of each type of article which must be ordered to maintain the inventory at a predetermined level.

A top member 93 having indexing holes 95 is aligned with the base 81 and the order form 89 by slidably engaging the pegs 87 with the holes 95. A plurality of inventory markers 99 are slidably positioned in slots 97 in the top member 93 and cover plates 101 having windows 103 therein retain the inventory markers 99 within their respective slots 97. The upper surfaces of the cover plates 101, as shown in FIG. 10, slidably engage a surface of the inventory marker 99 in retaining it within its slot 97. Each inventory marker 99 is provided with a pin 105 or similar marking instrument which extends through the window 103 beyond the outer surface of the cover plate 101.

Inscribed on the top member 93 at locations adjacent the several cover plates 101 are indicia 107. The respective inventory markers 99 and associated pins 105 are slid within slots 97 to reflect the number of articles presently in stock. With the inventory markers 99 thus indicating the stock numbers, i.e., the numbers of the several articles in stock, the top 93 is disposed upon the base 81 with the indexing pegs 87 extending through the indexing holes 95. The indicia 107 on the top member 93 and the indicia 92 on the order form 89 are thereby spatially related so that a numerical value indicating 100 percent on the indicia 107 (i.e., that 100 percent of the desired number of items is in the inventory) will correspond to a value of zero on the indicia 93 (i.e., that no additional items need to be ordered to bring the inventory up to the desired level). Similarly, a value of zero items on indicia 107 will correspond to a value of 100 percent on the indicia 92 which is equal to the total number of items desired in the inventory.

As the top member 93 is brought into engagement with order form 89, the pins 105 extend through the order form 89 and into the resilient pad 85. The order form 89 is thereby punched with holes indicating the number of articles needed to maintain the predetermined inventory level of the article. The order form 89 may then be removed from the base 81 and sent directly to the supplier in ordering the articles. As described, the apparatus of FIGS. 9 and 10 automatically transforms the number of the articles in stock into an order specifying the number of articles ordered to maintain the predetermined number of articles in the inventory.

As described previously, the embodiment of the invention illustrated in FIGS. 1 to 8 provides a means for both conveniently storing and maintaining the level of articles in an inventory. As the partition 35 is moved to reflect the volume of the bin 37 occupied by the articles in stock, this information may be directly transmitted to a card 53 by bringing the card into contact with pins 61 or other marking means carried by the partition 35. The card 53, in approaching the pins 61, is positioned in a plane at approximately a right angle to the axes of the pins 61. Thus, as the pins 61 pass through the card 53, they do not tear or gouge the card.

The embodiment of the invention illustrated in FIGS. 9 and 10 also provides a convenient way of ordering items for an inventory based on the volume occupied by the articles in a container. This information, for example, the volume occupied expressed as a percentage of the volume occupied when the number of items on hand is sufficient to fully stock the inventory, may then be translated to a usable form by moving inventory markers 99 to a position determined by the volume occupied by the particular articles in the inventory. Then, on bringing the top member 93 into contact with the order form 89 and placing the indexing holes 95 over the indexing pegs 87, the pins 105 carried by markers 99 punch holes in the coded order form 89. Due to the coded information on the form 89, the holes that are punched indicate the number of articles to be ordered to bring the inventory up to its predetermined level. The order form 89 may then be used, as is, to order the required number of articles from the supplier.

As demonstrated by the foregoing description, the invention provides a convenient apparatus and method for use by a merchant in maintaining a predetermined inventory level by ordering the required number of the various articles on a periodic basis. The invention provides a means of maintaining inventory levels which eliminates certain of the clerical operations previously used by small merchants in taking inventory. However, the apparatus and method of the invention is much simpler and less expensive than previous procedures which required the use of computers. Thus, the method and apparatus of the present invention should be particularly suitable for small and medium-size merchandisers who do not have the sales volume to justify the expense of high-cost computerized procedures.

I claim:

1. A storing and counting apparatus comprising:
    a container;
    partition means movable within said container to define the volume of a bin;
    indicator means interconnected with the partition means to indicate the position of the partition means within the container;
    marking means carried by said partition means;
    a lid pivotally mounted on said container;
    card support means positioned on the interior of the said lid, and
    means interconnecting the lid and the container to position the card supporting surface of the card support means at approximately a right angle to the axis of the marking means prior to contact of the marking means with the card supporting surface.

2. The apparatus of claim 1 including a plurality of interior walls within said container defining a plurality of bins;
    a plurality of partition means with each of said partition means being movable within an individual bin, and
    indicator means associated with each of said partition means to indicate the position of the said partition means within a particular bin.

3. The apparatus of claim 1 including a tongue and groove interconnection between the partition means and an inner wall of said container to maintain the position of the partition means with respect to the container.

4. The apparatus of claim 1 wherein said marking means includes a punch which is adapted to punch a hole on contact with a card carried by the card support means.

5. A storing and counting apparatus comprising:
    a container;
    a lid pivotally mounted on said container;
    partition means movable within said container to define the volume of a bin;
    indicator means interconnected with said partition means to indicate the position of said partition means within said container;
    card support means positioned on the interior of said lid;
    marking means carried by said partition means including a punch adapted to punch a hole in a card which may be carried by said card support means;
    card alignment means on said card support means to position a card which may be carried by the card support means such that selected indicia on the said card may be brought into engagement with the marking means;
    positioning means interconnected with the card support means to position the card supporting surface of the card support means at approximately a right angle to the axis of the marking means prior to contact of the marking means with the card supporting surface, and
    said card supporting surface including a resilient card backing carried on said surface.

6. An inventory counting and ordering apparatus comprising:
    a top member having slideways therein;
    indicator means slidably received in said slideways;
    marking means carried by said indicator means;
    a first set of indicia on said top member in juxtaposition to each of said slideways;
    each of said indicia indicating a numerical range expressing the number of articles in stock;
    a base member including an order card supporting surface;
    an order card supported on said supporting surface;
    a second set of indicia on said order card, each of said indicia indicating a numerical range indicating the number of articles to be ordered to maintain a predetermined inventory level of the article;
    positioning means to position said top member on said base member such that said top member occupies a predetermined position with respect to said base member with said marking means in contact with said order form card to form a permanent record thereon, and
    said first set of indicia being positioned with respect to said second set of indicia such that the numerical ranges of the first set of indicia are aligned with the numerical ranges of the second set of indicia with any particular stock number in the ranges of said first set of indicia designating an order number in said second set of indicia required to maintain the inventory for that article at a predetermined level.

7. The apparatus of claim 6 wherein said marking means comprises a punch adapted to punch a hole in said order card when said top member is positioned on said base member.

8. The apparatus of claim 6 wherein said first set of indicia represent a range of volume percentates expressing the volume of articles in stock with respect to the volume of the articles at a predetermined inventory level, whereby the volume of the articles in stock is translatable into an order number on said second set of indicia that is required to maintain the article at a predetermined inventory level.

* * * * *